United States Patent
Wang et al.

(10) Patent No.: US 11,204,885 B1
(45) Date of Patent: Dec. 21, 2021

(54) MOTHERBOARD AND SWITCHING SIGNAL SOURCE METHOD

(71) Applicant: Wistron Corp., New Taipei (TW)

(72) Inventors: Chin Tsan Wang, New Taipei (TW); Cheng Yu Wu, New Taipei (TW); Ming Hsiu Wu, New Taipei (TW); Che-Yuan Hsu, New Taipei (TW); Yun Sheng Jhan, New Taipei (TW); You Chang Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/998,113

(22) Filed: Aug. 20, 2020

(30) Foreign Application Priority Data

Jun. 19, 2020 (TW) ................................. 109120753

(51) Int. Cl.
*G06F 13/40* (2006.01)
*G06F 13/16* (2006.01)

(52) U.S. Cl.
CPC ...... *G06F 13/4022* (2013.01); *G06F 13/1668* (2013.01)

(58) Field of Classification Search
CPC ............. G06F 13/4022; G06F 13/1668; G06F 3/0689; G06F 3/0604; G06F 11/1048
See application file for complete search history.

(56) References Cited

U.S. PATENT DOCUMENTS

| 5,682,509 A * | 10/1997 | Kabenjian ............. G06F 3/0601 710/112 |
| 8,639,878 B1 | 1/2014 | Chatterjee et al. |
| 2003/0116624 A1 * | 6/2003 | Chen ................ G06K 19/07732 235/441 |

FOREIGN PATENT DOCUMENTS

CN 108681511 A 10/2018

* cited by examiner

*Primary Examiner* — Idriss N Alrobaye
*Assistant Examiner* — Ronald T Modo
(74) *Attorney, Agent, or Firm* — McClure, Qualey & Rodack, LLP

(57) ABSTRACT

A motherboard includes a connector, a multiplexer and a controller. The connector is configured to selectively couple a Redundant Array of Independent Disks (RAID) card. The connector is configured to generate a switching parameter. The multiplexer is coupled to the connector. The multiplexer is configured to detect the switching parameter. The controller is coupled to the multiplexer. The multiplexer either receives a software RAID establishment signal from the controller or it receives a hardware RAID establishment signal from the RAID card, according to the switching parameter.

12 Claims, 2 Drawing Sheets

MOTHERBOARD AND SWITCHING SIGNAL SOURCE METHOD

CROSS REFERENCE TO RELATED APPLICATIONS

This application claims priority of Taiwan Patent Application No. 109120753, filed on Jun. 19, 2020, the entirety of which is incorporated by reference herein.

BACKGROUND OF THE INVENTION

Field of the Invention

The present disclosure relates to a method for switching a signal source and, in particular, to a switching signal source method of a storage device on a motherboard.

Description of the Related Art

On a server's data access equipment, multiple separate storage devices (such as hard drives, M.2 solid-state drives (SSD)) are integrated using a virtual storage technology known as Redundant Array of Independent Disks (RAID). The purpose is to improve the performance, capacity and reliability of data storage. The disk array is divided into software RAID and hardware RAID. Also, software RAID uses system resources (computer's own processor, memory, controller . . . etc.) and the operating system (software) to complete the disk array. Hardware RAID uses the built-in processor of the RAID Card to independently manage and configure the disk array function.

These two disk array construction methods have their own advantages and disadvantages. Software RAID consumes more server computing resources than hardware RAID. The software RAID is limited by the operating system. The hardware RAID is not limited by the operating system. The price of software RAID is lower than that of hardware RAID. Therefore, the choice between the hardware RAID and the software RAID depends on the purpose and cost of the work, which often causes the user to be confused in the first choice.

In addition, the current motherboard design cannot immediately change the M.2 SSD into a hardware RAID or software RAID based on current needs. The current system is fixed into a RAID. If user needs to change the type of RAID, the user must replace the motherboard, which is very inconvenient and can impact user experience.

BRIEF SUMMARY OF THE INVENTION

In accordance with one feature of the present invention, the present disclosure provides a motherboard that includes a connector, a multiplexer and a controller. The connector is configured to selectively couple a Redundant Array of Independent Disks (RAID) card and generating a switching parameter. The multiplexer is coupled to the connector, configured to detect the switching parameter. Also, the controller is coupled to the multiplexer. The multiplexer receives a software RAID establishment signal from the controller or receives a hardware RAID establishment signal from the RAID card according to the switching parameter.

In accordance with one feature of the present invention, the present disclosure provides a switching signal source method. The switching signal source method is suitable for a storage device on a motherboard. The switching signal source method includes the following steps: selectively coupling a Redundant Array of Independent Disks (RAID) card and generating a switching parameter with a connector; using a multiplexer coupled to the connector and a controller to detect the switching parameter; and using the multiplexer to receive a software RAID establishment signal from the controller or a hardware RAID establishment signal from the RAID card, according to the switching parameter.

In summary, compared with the previous single-source disk array controller architecture, the motherboard and the switching signal source method can provide more flexibly and automatically switch the control circuit of the multi-source disk array. The motherboard and the switching signal source method support software RAID and/or hardware RAID according to user's needs and provide better flexibility and maintaining good signal quality. In addition, in a high-density multi-node server (for example, 2U4N server architecture), the motherboard and the switching signal source method provide the function to achieve the effect of automatically switching between hardware RAID and software RAID at any time, based on the user's considerations of performance or cost, without replacing the motherboard.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
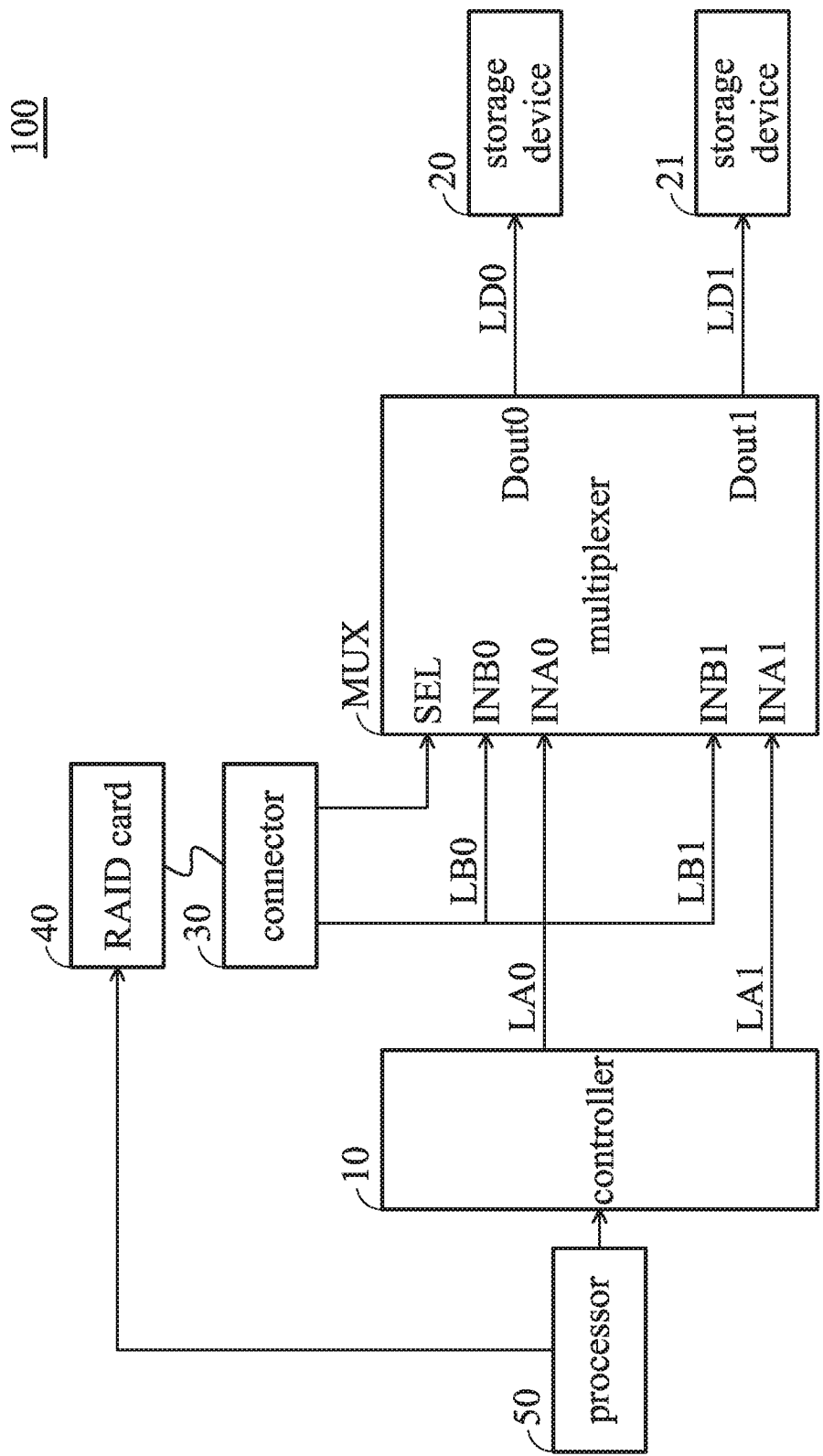
FIG. 1 is a block diagram of a motherboard in accordance with one embodiment of the present disclosure.

In the traditional server architecture, the same set of storage devices 20, 21 (for example, M.2 SSD) are only arranged with respect to one array architecture, which cannot satisfy the choice of different disk array architectures for different applications. Generally speaking, high-density multi-node servers (for example, in 2U4N server architecture, there are 4 motherboards 100 in a 2U unit rack) can support four nodes (i.e., four motherboards 100), to provide users with flexible adjustment of different node configurations to achieve the user's desired purpose. However, the traditional design cannot immediately change the storage devices 20 and 21 (as shown in FIG. 1) into a Redundant Array of Independent Disks (RAID) or software RAID according to current needs. The traditional system is fixed to a disk array method. If user needs to change the disk array method, user must replace it with another motherboard 100, which makes the user experience very inconvenient. This also violates the design of the 2U4N server architecture for achieving flexible configuration. In order to meet different applications at the same time, there are different choices of disk array architecture, so that users can choose different disk arrays without replacing the motherboard after purchasing the server. Therefore, embodiments of the invention provide a motherboard 100 and a switching signal source method 200, so that the motherboard 100 can automatically switch between hardware RAID and software RAID. In addition, the motherboard 100 and the switching signal source method 200 are applicable to be applied in general server architecture and to a high-density multi-node server (2U4N server architecture).

Figure 2:
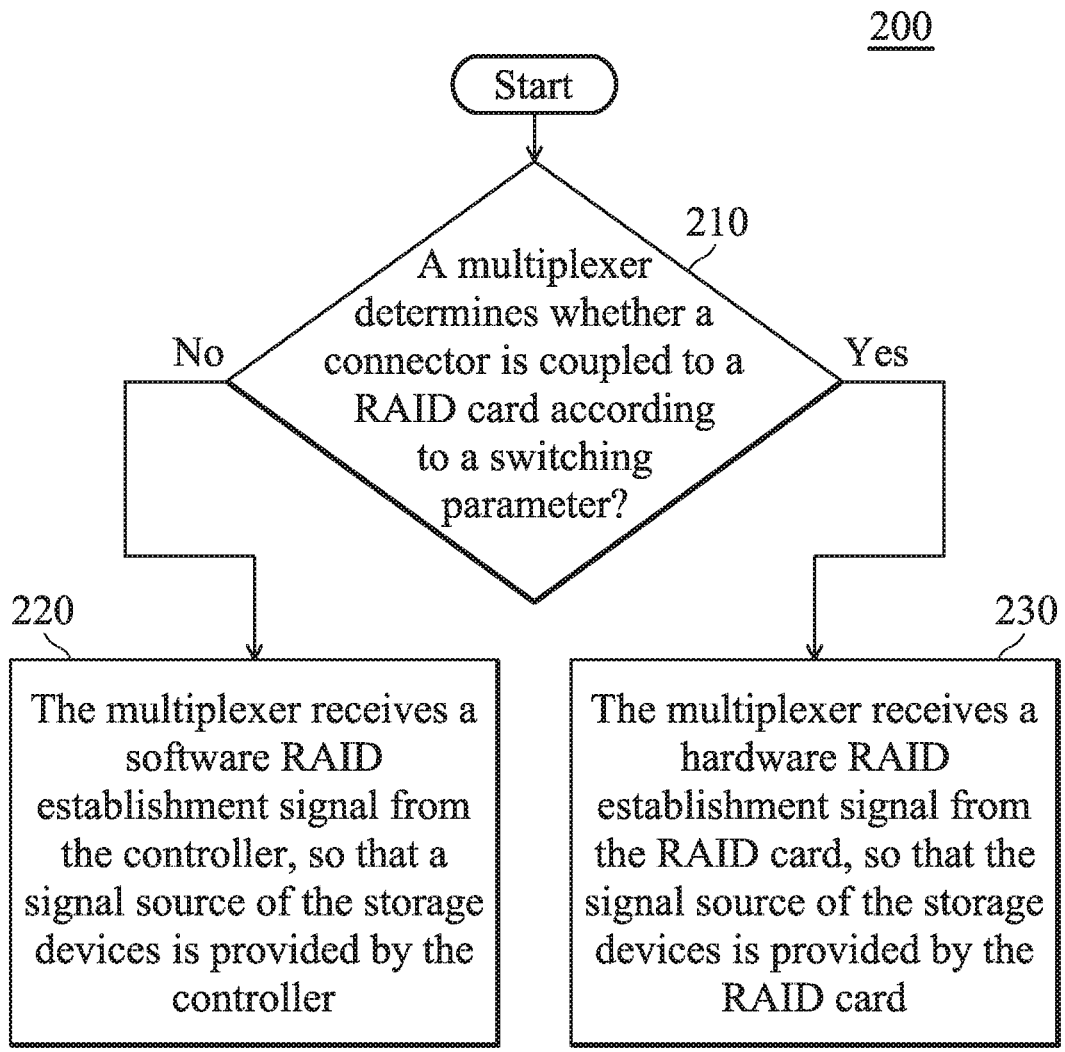
FIG. 2 is a flow chart of a switching signal source method in accordance with one embodiment of the present disclosure.

Please refer to FIGS. 1 and 2 together, FIG. 1A is a block diagram of a motherboard 100 in accordance with one embodiment of the present disclosure. FIG. 2 is a flowchart of a switching signal source method 200 in accordance with one embodiment of the present disclosure. The switching signal source method 200 can be implemented by components on the motherboard 100.

In one embodiment, as shown in FIG. 1, the motherboard 100 includes a multiplexer MUX, a controller 10, at least one storage device 20-21 and a connector 30. In one embodiment, the connector 30 is selectively coupled to the RAID card 40 (Redundant Array of Independent Disks Card) and generates a switching parameter. The multiplexer MUX receives a software RAID establishment signal from a controller 10 or receives a hardware RAID establishment signal from the RAID card 40 according to the switching parameters.

In one embodiment, a processor 50 is coupled to the controller 10, and the processor 50 is configured for data processing of the storage devices 20 and 21. When the connector 30 is coupled to the RAID card 40, the processor 50 accesses data through the RAID card 40. When the connector 30 is not coupled to the RAID card 40, the processor 50 accesses data through the controller 10.

In one embodiment, the controller 10 can be implemented by a platform path controller hub (PCH).

In one embodiment, the processor 50 can be implemented by an integrated circuit such as a micro controller, a microprocessor, a digital signal processor (DSP), or a field programmable gate array (FPGA), application specific integrated circuit (ASIC) or a logic circuit.

In one embodiment, the storage device 20 can be implemented by a hard disk or an M.2 solid-state drive (SSD). In one embodiment, the storage devices 20 and 21 are coupled to the multiplexer MUX. The storage devices 20 and 21 receive a software RAID establishment signal from the controller 10 according to a first parameter value of the switching parameter or a hardware RAID establishment signal from the RAID card 40 according to the second parameter value of the switching parameter. When the connector 30 is not coupled to the RAID card 40, the connector 30 generates the first parameter value of the switching parameter. When the connector 30 is coupled to the RAID card 40, the connector 30 generates the second parameter value of the switching parameter.

In one embodiment, the controller 10 is coupled to the multiplexer MUX through a communication interface (for example, Serial Advanced Technology Attachment (SATA)). For example, the controller 10 is coupled to the input channel INA0 of the multiplexer MUX through the SATA interface LA0. For example, the controller 10 is coupled to the input channel INA1 of the multiplexer MUX through the SATA interface LA1.

In one embodiment, the output channels Dout0 and Dout1 of the multiplexer MUX are coupled to the storage devices 20, 21 through a communication interface (such as SATA or Peripheral Component Interconnect Express (PCIe)). For example, the output channel Dout0 of the multiplexer MUX is coupled to the storage device 20 through the SATA or PCIe interface LD0. For example, the output channel Dout1 of the multiplexer MUX is coupled to the storage device 21 through the SATA or PCIe interface LD1.

In one embodiment, the connector 30 is electrically coupled to the selection channel SEL of the multiplexer MUX. In addition, the connector 30 is connected to the input channel INB0 of the multiplexer MUX through the SATA interface, and is connected to the input channel INB1 of the multiplexer MUX through the SATA interface.

Those of ordinary skill in the art should understand that a configuration of the components disposed on the motherboard 100 is just an example. In practice, more multiplexers MUX, more storage devices, and/or more connectors can be used to construct software RAID or hardware RAID (need to be coupled to a RAID card) on the storage device. On the other hand, the motherboard 100 can also use only one storage device, one input channel, one output channel, one connector, and one controller to construct software RAID or hardware RAID (need to be coupled to a RAID card).

In an embodiment, the controller 10 can construct a software RAID on the storage devices 20 and 21. The hardware RAID requires the RAID card 40 to construct the hardware RAID on the storage devices 20 and 21 when the connector 30 is connected to the RAID card 40. Also, software RAID involves the use of system resources (computer's processor, controller 10, etc.) and the operating system (software) to complete the disk array. Hardware RAID uses the built-in processor of the RAID card 40 to independently manage and configure the disk array function. The switching signal source method 200 is described below with reference to FIG. 2.

In one embodiment, step 210 is entered after booting (for example, after pressing the power button of the host). In one embodiment, the multiplexer MUX is used to select a signal source of a storage device according to a switching parameter.

In step 210, a multiplexer MUX determines whether a connector 30 is coupled to a RAID card 40 according to a switching parameter. If yes, step 230 is performed. If no, step 220 is performed.

In one embodiment, after power-on, the general-purpose output and input pins (GPIO) of the multiplexer MUX detect that the switching parameter is currently 1 (first parameter value) or 0 (second Parameter value), the processor 50 can access the storage devices 20, 21 via the RAID card 40 or the controller 10.

In one embodiment, when the multiplexer MUX determines that the switching parameter is the first parameter value, it means that the connector 30 is not coupled to the RAID card 40, and then step 220 is performed. When the multiplexer MUX determines that the switching parameter is the second parameter value, which means that the connector 30 is coupled to the RAID card 40, step 230 is performed.

In step 220, the multiplexer MUX receives a software RAID establishment signal from the controller 10, so that a signal source of the storage devices 20, 21 is provided by the controller 10.

In one embodiment, the connector 30 transmits the switching parameter to the selection channel SEL of the multiplexer MUX.

In one embodiment, the first parameter value is 1, which represents a high level. After receiving the first parameter value of the switching parameter, the multiplexer MUX turns on at least one first channel (such as an input channel INA0, INA1) corresponding to the controller 10 to receive the first signal source from the controller 10 (i.e., the signal source is from the controller 10). In other words, when the switch parameter is 1, the data or signals required to create the software RAID will be sent by the controller 10 to the input channels INA0, INA1 of the multiplexer MUX through the SATA interfaces LA0, LA1. Then, the output channels Dout0 and Dout1 of the multiplexer MUX send data or messages to the storage devices 20 and 21 through the SATA or PCIe interfaces LD0 and LD1.

In one embodiment, when the connector 30 is not coupled to the RAID card 40, the connector 30 transmits the first parameter value to the multiplexer MUX, causing the controller 10 to send a software RAID establishment signal to the multiplexer MUX. The signal source is provided by the controller 10 so that the controller 10 can establish a software RAID on the storage devices 20 and 21.

In one embodiment, the signal source of the controller 10 uses equalization and de-emphasis technologies to achieve signal quality optimization to provide the storage device 20, 21 with excellent signal quality.

In an embodiment, the processor 50 can access the data in the storage devices 20 and 21 to perform calculations. For example, the processor 50 sends out a read signal to the storage devices 20 and 21 to obtain data corresponding to the read signal. Also, the transmission path for transmitting the read signal to the storage devices 20 and 21 sequentially is: the controller 10, the SATA interface LA0, LA1, the input channels INA0, INA1 of the multiplexer MUX, the output channels Dout0, Dout1 of the multiplexer MUX, and interfaces LD0, LD1. Then, the storage devices 20, 21 return the data to the processor 50 according to the transmission path.

In one embodiment, when the connector 30 is not coupled to the RAID card 40, the controller 10 is preset to create a software RAID on the storage devices 20 and 21.

In step 230, the multiplexer MUX receives a hardware RAID establishment signal from the RAID card 40, so that the signal source of the storage devices 20, 21 is provided by the RAID card 40.

In one embodiment, the connector 30 transmits the switching parameter to the selection channel SEL of the multiplexer MUX.

In one embodiment, the second parameter value is 0, which represents a low level. After receiving the second parameter value of the switching parameter, the multiplexer MUX opens at least one second channel (e.g., input channels INB0, INB1) corresponding to the connector 30 to receive the second signal source from the RAID card 40 (i.e., the signal source is switched to be provided from the RAID card 40). In other words, when the switch parameter is 0, the data or signals required to establish the hardware RAID are sent from the connector 30 to the input channels INB0 and INB1 of the multiplexer MUX through the SATA interfaces LB0 and LB1. Then, the output channels Dout0 and Dout1 of the multiplexer MUX send data or messages to the storage devices 20 and 21 through the SATA or PCIe interfaces LD0 and LD1.

In one embodiment, the signal source of the RAID card 40 uses equalization and de-emphasis technology to achieve the optimization of the signal quality, so as to provide the storage device 20, 21 with excellent signal quality. Establishing a hardware RAID through the RAID card 40 can reduce the calculation burden of the controller 10. In one embodiment, the processor 50 can access the data in the storage devices 20 and 21 to perform calculations. For example, the processor 50 sends out a read signal to the storage devices 20 and 21 to obtain data corresponding to the read signal. Also, the transmission path for transmitting the read signal to the storage devices 20 and 21 sequentially is: RAID card 40, connector 30, SATA interface LB0, LB1, input channels INB0, INB1 of the multiplexer MUX, the output channels Dout0, Dout1 of the multiplexer MUX, and interfaces LD0, LD1. Then, the storage devices 20, 21 return the data to the processor 50 according to the transmission path.

In one embodiment, when the connector 30 detects that the RAID card 40 is removed, step 220 is performed to rebuild the software RAID on the storage devices 20 and 21.

Based on above, when the multiplexer MUX receives the first parameter value of the switching parameter, the multiplexer MUX receives a first signal source provided by the controller 10, so that the controller 10 establishes a software RAID. When the multiplexer MUX receives the second parameter value of the switching parameter, the multiplexer MUX receives a second signal source provided by the RAID card 40 connected to the connector 30, so that the RAID card 40 establishes a hardware RAID on the storage devices 20 and 21.

In summary, compared with the previous single-source disk array controller architecture, the motherboard and the switching signal source method can provide more flexibly and automatically switch the control circuit of the multi-source disk array. The motherboard and the switching signal source method support software RAID and/or hardware RAID according to user's needs and provide better flexibility and maintaining good signal quality. In addition, in a high-density multi-node server (for example, 2U4N server architecture), the motherboard and the switching signal source method provide the function to achieve the effect of automatically switching between hardware RAID and software RAID at any time, based on the user's considerations of performance or cost, without replacing the motherboard.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A motherboard, comprising:
   a connector, configured to selectively couple a Redundant Array of Independent Disks (RAID) card and generate a switching parameter;
   a multiplexer, coupled to the connector, and configured to detect the switching parameter generated by the connector; and
   a controller, coupled to the multiplexer;
   wherein the multiplexer selects between a software RAID establishment signal from the controller or a hardware RAID establishment signal from the RAID card according to a value of the switching parameter;
   wherein when the connector is not coupled to the RAID card, the connector generates the first parameter value of the switching parameter;
   wherein when the connector is coupled to the RAID card, the connector generates the second parameter value of the switching parameter.

2. The motherboard of claim 1, further comprising:
   a storage device, coupled to the multiplexer, configured to receive the software RAID establishment signal from the controller according to the first parameter value of the switching parameter or to receive the hardware RAID establishment signal from the RAID card according to the second parameter value of the switching parameter.

3. The motherboard of claim 2, wherein when the multiplexer receives the first parameter value of the switching parameter, the multiplexer receives a first signal provided by the controller, so that the controller creates a software RAID on the storage device; when the multiplexer receives the second parameter value of the switching parameter, the multiplexer receives a second signal provided by the RAID card to enable the RAID card to establish a hardware RAID on the storage device.

4. The motherboard of claim 3, wherein when the first parameter value is a high level, after receiving the first parameter value of the switching parameter, the multiplexer opens at least a first channel corresponding to the controller to receive the first signal from the controller.

5. The motherboard of claim 3, wherein when the second parameter value is a low level, after receiving the second parameter value of the switching parameter, the multiplexer opens at least a second channel corresponding to the connector to receive the second signal from the RAID card.

6. The motherboard of claim 2, wherein where when the connector is not coupled to the RAID card, the connector presets the first parameter value of the switching parameter to the multiplexer, so that the controller creates a software RAID on the storage device.

7. A switching signal source method, suitable for a storage device on a motherboard, the switching signal source method comprising:
   selectively coupling a Redundant Array of Independent Disks (RAID) card and generating a switching parameter with a connector;
   detecting the switching parameter by use of a multiplexer coupled to the connector and a controller; and
   selecting between a software RAID establishment signal from the controller or a hardware RAID establishment signal from the RAID card according to a value of the switching parameter;
   wherein when the connector is not coupled to the RAID card, the connector generates a first value of the switching parameter;
   wherein when the connector is coupled to the RAID card, the connector generates a second value of the switching parameter, wherein the second value is different than the first value.

8. The switching signal source method of claim 7, further comprising:
   coupling a storage device to the multiplexer; and
   receiving the software RAID establishment signal from the controller according to the first parameter value of the switching parameter or it receives the hardware RAID establishment signal from the RAID card according to the second parameter value of the switching parameter.

9. The switching signal source method of claim 8, further comprising:
   wherein when the multiplexer receives the first parameter value of the switching parameter, the multiplexer receives a first signal provided by the controller, so that the controller creates a software RAID on the storage device; when the multiplexer receives the second parameter value of the switching parameter, the multiplexer receives a second signal provided by the RAID card to enable the RAID card to establish a hardware RAID on the storage device.

10. The switching signal source method of claim 9, wherein when the first parameter value is a high level, after receiving the first parameter value of the switching parameter, the multiplexer opens at least a first channel corresponding to the controller to receive the first signal from the controller.

11. The switching signal source method of claim 9, wherein where when the second parameter value is a low level, after receiving the second parameter value of the switching parameter, the multiplexer opens at least a second channel corresponding to the connector to receive the second signal from the RAID card.

12. The switching signal source method of claim 8, wherein when the connector is not coupled to the RAID card, the connector presets the first parameter value of the switching parameter to the multiplexer, so that the controller creates a software RAID on the storage device.

* * * * *